United States Patent
Gao et al.

(10) Patent No.: US 11,222,019 B1
(45) Date of Patent: Jan. 11, 2022

(54) AUTOMATIC PRUNING CUTOFF IN A DATABASE SYSTEM

(71) Applicant: Snowflake Inc., Bozeman, MT (US)

(72) Inventors: Bicheng Gao, San Mateo, CA (US); Srinivas Vemuri, San Mateo, CA (US); Jiaqi Yan, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/165,194

(22) Filed: Feb. 2, 2021

Related U.S. Application Data

(60) Provisional application No. 63/108,223, filed on Oct. 30, 2020.

(51) Int. Cl.
  *G06F 16/2455* (2019.01)
  *G06F 11/34* (2006.01)
  *G06F 16/248* (2019.01)
  *G06F 16/22* (2019.01)

(52) U.S. Cl.
  CPC .... *G06F 16/24554* (2019.01); *G06F 11/3409* (2013.01); *G06F 16/2282* (2019.01); *G06F 16/248* (2019.01)

(58) Field of Classification Search
  USPC ........................................................ 707/769
  See application file for complete search history.

(56) References Cited

U.S. PATENT DOCUMENTS

| | | | |
|---|---|---|---|
| 6,278,998 B1 | 8/2001 | Ozden et al. | |
| 7,685,086 B2 | 3/2010 | Brown et al. | |
| 7,805,411 B2 | 9/2010 | Ziauddin et al. | |
| 7,877,374 B2 | 1/2011 | Zabback et al. | |
| 10,025,822 B2 | 7/2018 | Das et al. | |
| 10,628,244 B1 | 4/2020 | Cseri et al. | |
| 10,762,067 B2 | 9/2020 | Yan et al. | |
| 10,769,150 B1 | 9/2020 | Cruanes et al. | |
| 10,956,394 B2 | 3/2021 | Yan et al. | |
| 2005/0097072 A1* | 5/2005 | Brown ................ | G06F 16/2465 |
| 2005/0120000 A1 | 6/2005 | Ziauddin et al. | |
| 2007/0078813 A1* | 4/2007 | Beavin .............. | G06F 16/24557 |
| 2007/0250476 A1 | 10/2007 | Krasnik | |

(Continued)

OTHER PUBLICATIONS

"U.S. Appl. No. 17/162,979, Non-Final Office Action dated Apr. 1, 2021", 30 pages.

(Continued)

*Primary Examiner* — Muluemebet Gurmu
(74) *Attorney, Agent, or Firm* — Schwegman Lundberg & Woessner, P.A.

(57) ABSTRACT

The subject technology receives, during a query compilation process, a query directed to a set of source tables, each source table from the set of source tables being organized into at least one micro-partition and the query including at least one pruning operation. The subject technology performs, during the query compilation process, a modification of the query for adjusting the at least one pruning operation, the modification being based at least in part on a set of statistics collected for previous pruning operations on at least a portion of the set of source tables and a set of heuristics. The subject technology compiles the query including the modification of the query. The subject technology provides the compiled query to an execution node of a database system for execution.

30 Claims, 6 Drawing Sheets

(56) References Cited

U.S. PATENT DOCUMENTS

| | | | |
|---|---|---|---|
| 2008/0133458 | A1 | 6/2008 | Zabback et al. |
| 2011/0029557 | A1* | 2/2011 | Raghavan ......... G06F 16/24557 707/769 |
| 2012/0179669 | A1 | 7/2012 | Al-omari et al. |
| 2014/0358894 | A1* | 12/2014 | Wei ..................... G06F 16/2453 707/713 |
| 2016/0035375 | A1 | 2/2016 | Gao |
| 2016/0162364 | A1 | 6/2016 | Mutha et al. |
| 2016/0350347 | A1 | 12/2016 | Das et al. |
| 2016/0350371 | A1 | 12/2016 | Das et al. |
| 2016/0350375 | A1 | 12/2016 | Das et al. |
| 2016/0350392 | A1 | 12/2016 | Rice |
| 2017/0357692 | A1* | 12/2017 | Su ..................... G06F 16/24544 |
| 2018/0068008 | A1 | 3/2018 | Cruanes et al. |
| 2019/0236193 | A1* | 8/2019 | Chen .................. G06F 16/2282 |
| 2019/0317916 | A1* | 10/2019 | Deshpande ......... G06F 16/2365 |

OTHER PUBLICATIONS

"U.S. Appl. No. 17/162,979, Response filed Jul. 1, 2021 to Non-Final Office Action dated Apr. 1, 2021", 13 pages.
"U.S. Appl. No. 17/162,979, Final Office Action dated Aug. 19, 2021".
"International Application Serial No. PCT/US2021/039851, International Search Report dated Aug. 5, 2021", 3 pgs.
"International Application Serial No. PCT/US2021/039851, Written Opinion dated Aug. 5, 2021", 10 pgs.
"U.S. Appl. No. 17/162,979, Response filed Oct. 13, 2021 to Final Office Action dated Aug. 19, 2021", 12 pgs.

* cited by examiner

AUTOMATIC PRUNING CUTOFF IN A DATABASE SYSTEM

CROSS-REFERENCE TO RELATED APPLICATIONS

This application claims priority to U.S. Provisional Patent Application Ser. No. 63/108,223, filed Oct. 30, 2020, entitled "AUTOMATIC PRUNING CUTOFF IN A DATABASE SYSTEM," and the contents of which is incorporated herein by reference in their entireties for all purposes.

TECHNICAL FIELD

Embodiments of the disclosure relate generally to databases and, more specifically, to generating and using pruning cutoffs to enhance database query processing in a cloud data warehouse system.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Databases are used by various entities and companies for storing information that may need to be accessed or analyzed.

A cloud data warehouse (also referred to as a "network-based data warehouse" or simply as a "data warehouse") is a network-based system used for data analysis and reporting that comprises a central repository of integrated data from one or more disparate sources. A cloud data warehouse can store current and historical data that can be used for creating analytical reports for an enterprise based on data stored within databases of the enterprise. To this end, data warehouses typically provide business intelligence tools, tools to extract, transform, and load data into the repository, and tools to manage and retrieve metadata.

When certain information is to be extracted from a database, a query statement may be executed against the database data. A cloud data warehouse system processes the query and returns certain data according to one or more query predicates that indicate what information should be returned by the query. The data warehouse system extracts specific data from the database and formats that data into a readable form. However, it can be challenging to execute queries on a very large table because a significant amount of time and computing resources are required to scan an entire table to identify data that satisfies the query.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
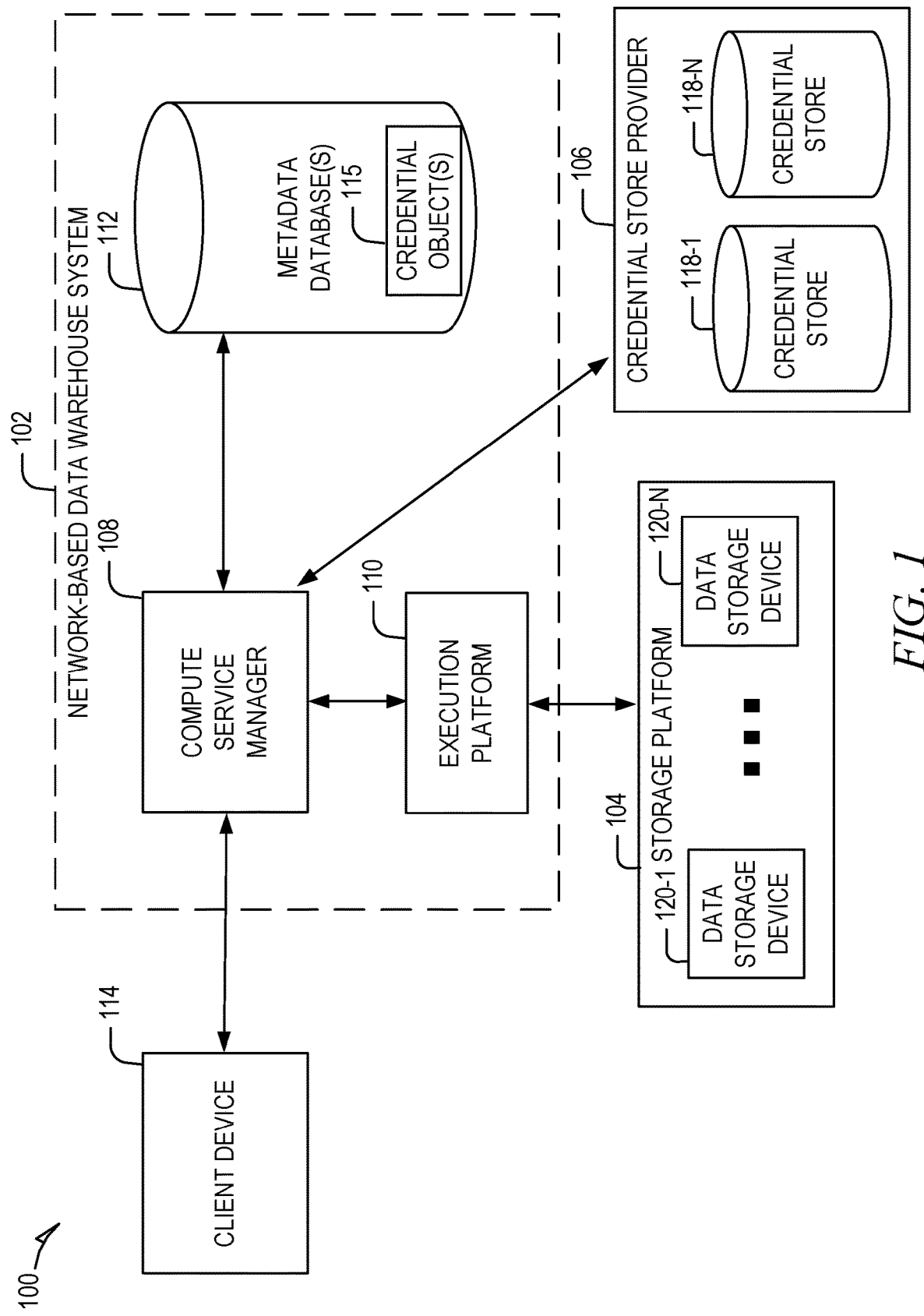
FIG. 1 illustrates an example computing environment that includes a network-based data warehouse system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Processing queries directed to very large tables is challenging because a significant amount of time and computing resources are required to scan an entire table to identify data that satisfies the query. Therefore, it can be desirable to execute a query without scanning the entire table.

Groups of rows in tables may be mapped into individual "micro-partitions" (described further herein) that are organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. However, analyzing such metadata as part of the pruning process can be computationally intensive thereby increasing the time (e.g., query latency) for returning results of the query.

For example, pruning on large tables could become a major source of slow compilation issues. Ineffective pruning of various regions or columns of a given table could result in expensive loading of micro-partition metadata, and pruning evaluation for generalized query predicates over a large number of micro-partitions can be computationally expensive. Ineffective pruning over columns with string data could take an inordinate period of time. Additionally, non-optimal pruning ordering, where more selective predicates are evaluated after less selective ones, can also make pruning less efficient.

Ultimately, pruning aims to improve query execution time by reducing the amount of micro-partitions that need to be scanned during query execution. Oftentimes, however, pruning may be performed without yielding too many benefits to query execution. The subject technology addresses the above issues by providing pruning cutoff(s) to avoid doing unnecessary pruning that does not help (e.g., reduce query latency) with query execution time. Consequently, the subject technology advantageously provides implementations of a more optimized pruning process that remove unnecessary pruning operations for a given query and/or scan set for the query (described further herein).

FIG. 1 illustrates an example computing environment 100 that includes a database system in the example form of a network-based data warehouse system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based data warehouse system 102 in communication with a cloud storage platform 104 (e.g., AWS®, Microsoft Azure Blob Storage®, or Google Cloud Storage), and a cloud credential store provider 106. The network-based data warehouse system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data warehouse system 102.

The network-based data warehouse system 102 comprises a compute service manager 108, an execution platform 110, and one or more metadata databases 112. The network-based data warehouse system 102 hosts and provides data reporting and analysis services to multiple client accounts.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data warehouse system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based data warehouse system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

In an embodiment, a data structure can be utilized for storage of database metadata in the metadata database 112. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML, statement such as an insert, delete, merge, and/or update command. Each time a DML statement is executed on the table, and a new table version is generated, one or more new micro-partitions may be generated that reflect the DML, statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enables the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table. Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database 112 includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given query provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple queries determined by the compute service manager 108. These queries are scheduled and managed by the compute service manager 108 to determine when and how to execute the query. For example, the compute service manager 108 may divide the query into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
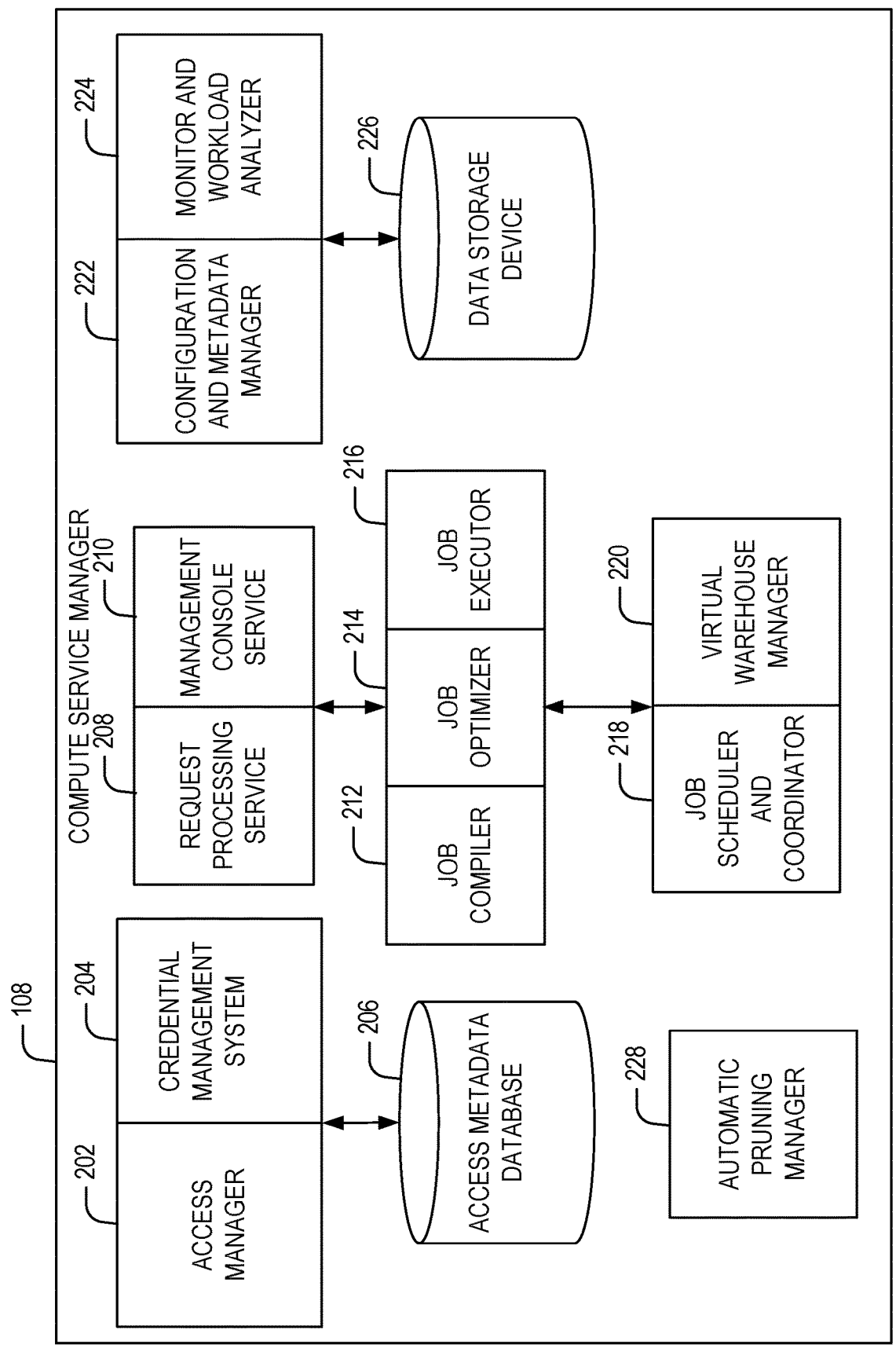
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., queries to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a query which encapsulates database queries and monitor the workload on the system.

The compute service manager 108 also includes a query compiler 212, a query optimizer 214 and a query executor 216. The query compiler 212 parses a query into multiple discrete tasks and generates the execution code for each of the multiple discrete tasks. The query optimizer 214 determines the best method to execute the multiple discrete tasks based on the data that needs to be processed. The query executor 216 executes the execution code for queries received from a queue or determined by the compute service manager 108.

As further shown, an automatic pruning manager 228 can communicate with the query compiler 212. In an embodiment, the automatic pruning manager 228 analyzes statistics regarding pruning operations to improve the speed and efficiency of executing the query (e.g., by not performing a given pruning operation(s)), and may return information regarding the same to the query compiler 212.

As described further herein, the automatic pruning manager 228 can perform operations to analyze a given query received by the request processing service 208 that subsequently forward to the received query to the automatic pruning manager 228 and the query compiler 212 for compilation into execution code. In an embodiment, the compute service manager 108 (or the query compiler 212) can perform pruning of the received query. However, in some examples, pruning on large tables can be a significant source of slow compilation issues when turning the received query to execution code. Pruning aims to improve query execution time by reducing the amount of micro-partitions that need to be scanned during query execution. Oftentimes, however, pruning is performed without yielding too many benefits to query execution. Given a query directed at a source table organized into a set of micro-partitions, the computing service manager 108 can determine a second set of micro-partitions to scan in executing the query. The second set of micro-partitions to scan in executing a query may be referred to herein as a "scan set". It is understood that in some instances the aforementioned second set of micro-partitions can be the same as the set of micro-partitions of a given source table, while in some instances the second set of micro-partitions can be a subset of the set of micro-partitions of the source table.

A query scheduler and coordinator 218 sends received queries to the appropriate services or systems for compilation, optimization, and dispatch to the execution platform 110. For example, queries may be prioritized and then processed in that prioritized order. In an embodiment, the query scheduler and coordinator 218 determines a priority for internal queries that are scheduled by the compute service manager 108 with other "outside" queries such as user queries that may be scheduled by other systems in the database but may utilize the same processing resources in the execution platform 110. In some embodiments, the query scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or query. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based data warehouse system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As further illustrated, the compute service manager 108 includes an automatic pruning manager 228, which is described in further detail in FIG. 4 below. The automatic pruning manager 228 can analyze a given query and determine whether to forego pruning on a corresponding set of input data for a number of predicates, such as source tables or subset of columns in source tables, and the like. In an example, a large source table may be (logically) organized as a set of regions in which each region can be further organized into a set of micro-partitions. Additionally, each micro-partition can be stored as a respective file in the subject system in an embodiment. Thus, the term "file" (or "data file") as mentioned herein can refer to a micro-partition or object for storing data in a storage device or storage platform (e.g., storage platform 104).

As discussed herein, a "micro-partition" is a batch unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allows for extremely granular selection of the micro-partitions to be scanned, which can be composed of millions, or even hundreds of millions, of micro-partitions. This granular selection process for micro-partitions to be scanned is referred to herein as "pruning."

In an example, pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. The following are various definitions for terms mentioned herein.

Pruner Tree Definition:
  Each node in the pruner tree represents a predicate which involves one or several columns from the source tables.
  Internal nodes (non-leaf nodes) of the pruner tree represent a Boolean expression, which can have three types:
    NOT pruner node: It has one and only one child
    AND pruner node: It has two or more pruner nodes as its children. Each child node represents a conjunct.
    OR pruner node: It has two or more pruner nodes as its children. Each child node represents a disjunct.
  Leaf nodes of the pruner tree: representing atomic predicates that can be used to filter out rows based on the subset of the columns.

Multi-Level pruning: In an embodiment, the subject system implements two level pruning, and can be extended to multiple level pruning (e.g., more than two levels). The two level pruning includes region level pruning and file level pruning. In an example, a region is a group of different files, every two regions are mutually exclusive, and all regions can cover all files/micro-partitions to be pruned. In an example, the following applies: a) region level pruning: pruning is based on the expression property of each region, and in region level pruning, no pruning cutoff is applied; and b) file level pruning: pruning is based on the expression property of each file/micro-partition, and pruning cutoff happens at this level.

Factors that Influence the Pruning Time:
  Fast pruners: pruners with operators like >, <, =, !=, >=, <=, is null (check whether the content is null), is not null (check whether the content is not null) etc. Expression properties including min/max value, nullness etc., can be utilized to more quickly determine whether the file/region can satisfy those predicates based on the expression property.
  Generic pruners: Some functions are wrapping the columns, it will take some time to evaluate the expression property of those functions.
  Pruner over string column: comparing strings is time consuming, for example, checking whether the given string is greater than a string literal, it requires to compare each character one by one until you find one different character.

Factors that Influence the Execution Time:
  warehouse size: larger warehouses have more computational resources, it can be more efficient in dealing with the query that will operate on large tables or require lots of computations.

In one embodiment, micro-partitioning may be automatically performed on all tables. For example, tables may be transparently partitioned using the ordering that occurs when the data is inserted/loaded. It is appreciated that other types of ordering are contemplated by the subject technology.

One objective of automatic pruning manager 228 is to implement a pruner cutoff based on various metrics (discussed further in FIG. 4 below) with a goal of reducing a total query elapsed time which includes 1) query compilation time, and 2) query execution time. Pruning cutoff aims to achieve minimum query elapsed time through balancing query compilation time and query execution time.

The following discussion describes an initial predicate ordering heuristic algorithm, checkpoints, and statistics collection, which are different phases that the automatic pruning manager 228 perform/undergo in some embodiments.

Initial Predicate Ordering Heuristic Algorithm:
Apriority score is calculated for each pruner and the pruners are ordered based on priority score. For internal and leaf nodes, there are two ways to generate the score:
  Leaf Node: Based on the pruner type, an existing score is assigned
  Internal Node: Children of the internal node are ranked by their priority score. A score of this internal node is calculated from a formula which uses the priority score of all its children as arguments.

Checkpoints: The checkpoints are set between two consecutive regions. During file level pruning, the current pruning statistics are checked for each pruner, and decisions can be made to perform cutoffs. Reordering of the pruners with their corresponding siblings in the pruner tree based on the pruner statistics is performed. The reordering can be invoked irrespective of the cutoff of pruners in each checkpoint. The change of order is based on the pruner statistics, such that it's possible that the order remains unchanged in some instances.

Stats Collection: The statistics collection and pruning can be performed simultaneously (e.g., at substantially a same time).
  For region level pruning: A bitset is passed to the pruner tree to perform the pruning, where the bitset can indicate whether each region will remain after pruning. In addition, the result bitset and resource usage information after each pruner can be utilized to update the statistics for each pruner.
  For file level pruning: Bitsets of each region are passed to the pruner tree when pruning on the files of each region. The bitset can indicate whether each file of this region will remain after pruning. The result bitset and resource usage information can be utilized to update each pruner's statistics after each pruner's pruning.

In an example, one approach involves the automatic pruning manager 228 sampling regions to gather statistics (e.g., output file counts, pruning time, pass rate/selectivity)

for each pruner. The automatic pruning manager 228 performs cutoff decisions for each pruner in a pruner tree based on such statistics. A pruner tree is a tree structure which includes pruners (e.g., corresponding to pruning operations, and the like) as respective nodes in the tree structure. Examples of such pruning operations are related to predicates in respective SQL queries.

As referred to herein, "pass rate" is the percent of files that pass a specific pruner. For example, a high pass rate indicates a large proportion of files are evaluated to be true, hence a low pruning effectiveness. As referred to herein a time value is, per a unit of time, the total number of files can be pruned out. For example, a high time value indicates more files can be pruned out, hence a high pruning performance. In an embodiment, the time value can be expressed by the following:

(1−pass rate)/(total time for evaluating a number of micro-partitions)

In an embodiment, the automatic pruning manager 228 utilizes a pruner tree structure for pruners (e.g., "pruner tree" or "pruner tree structure"). The automatic pruning manager 228 passes all of the micro-partitions into the root of the tree structure and walks through the pruner tree in a depth first search (DFS) order. In an example, at least some of the micro-partitions may be pruned out in one specific pruner, so for all pruners in the visiting order, there can be a non-increasing number of input micro-partition count, which is the same as the output micro-partition count of the previous pruner.

In an embodiment, the automatic pruning manager 228 implements two-level pruning. Further, the automatic pruning manager 228 utilizes the following approaches for cutoffs:

1) Predicate cutoff: After pruning for a while, the automatic pruning manager 228 could determine certain predicates are either too expensive or too ineffective to justify pruning over further. For these predicates, the automatic pruning manager 228 removes them from the pruning structure, and retains the effective pruners to speed up the pruning process.

2) Global cutoff: this refers to the decision where the automatic pruning manager 228 skips all the remaining pruning on the table since a "good enough" state has been reached.

3) Predicate re-ordering: the automatic pruning manager 228 sets an order for pruners based on a heuristic algorithm before the pruning. In an example, the heuristic is limited since it does not cover all cases, and it can be more advantageous to re-order the pruners (e.g., respective nodes in a given pruner tree) based on their real time statistics during the pruning. Also, when some pruners are cutoff from the pruner tree, the relationship between siblings' nodes in the pruner tree may change due to the statistics changing. For example, node A and node B are siblings, previously node A comes before node B in the order set by heuristic, when one pruner is cutoff in subtree of node B, then the total time spent on subtree of node B decreases, all metrics for node B will change, so as the pruning performance. If node B performs better than node A, the automatic pruning manager 228 puts node B before node A.

Figure 3:
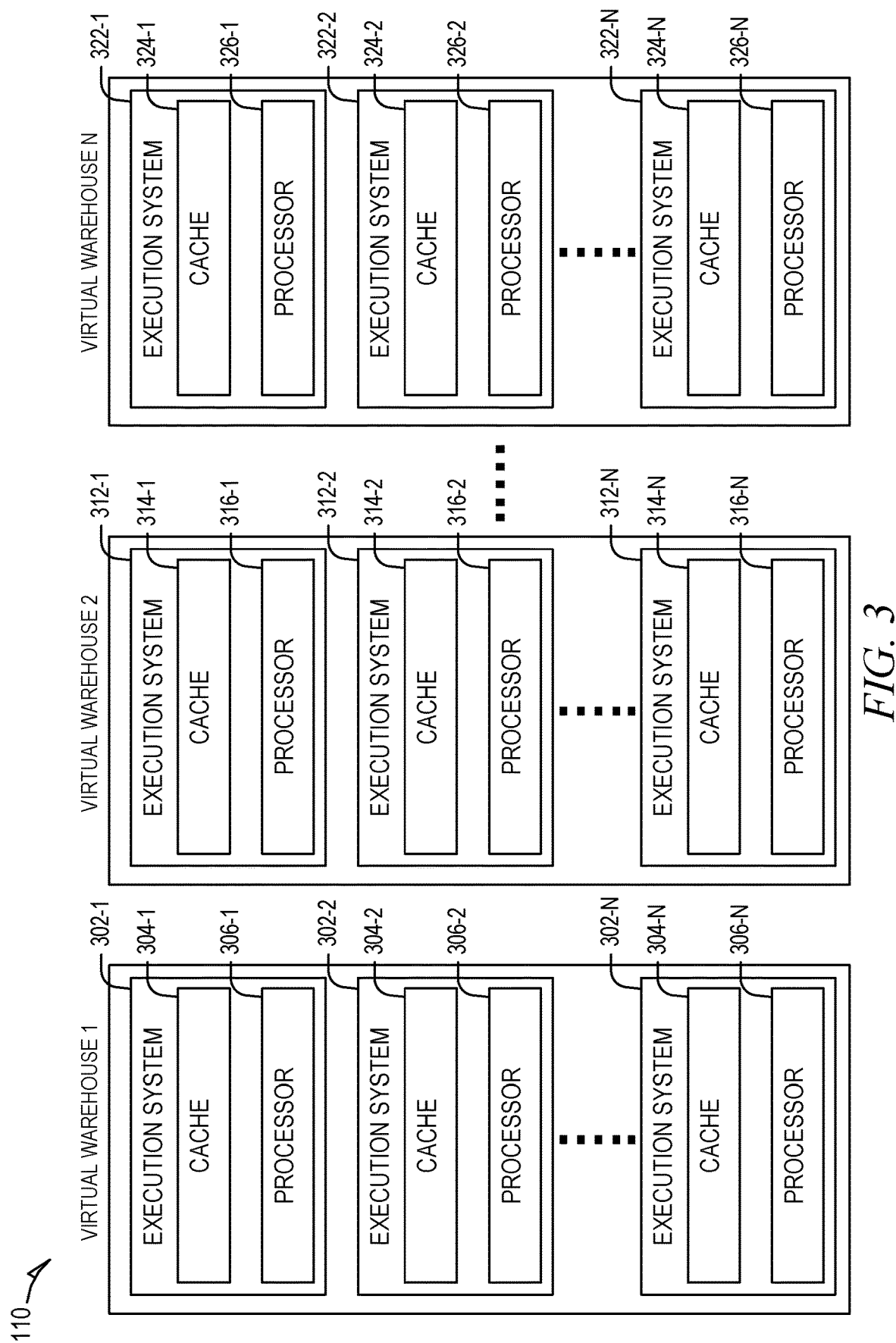
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-*n*. Execution node 302-1 includes a cache 304-1 and a processor 306-1. Execution node 302-2 includes a cache 304-2 and a processor 306-2. Execution node 302-*n* includes a cache 304-*n* and a processor 306-*n*. Each execution node 302-1, 302-2, and 302-*n* is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-*n*. Execution node 312-1 includes a cache 314-1 and a processor 316-1. Execution node 312-2 includes a cache 314-2 and a processor 316-2. Execution node 312-*n* includes a cache 314-*n* and a processor 316-*n*. Additionally, virtual warehouse 3 includes three execution nodes 322-1, 322-2, and 322-*n*. Execution node 322-1 includes a cache 324-1 and a processor 326-1. Execution node 322-2 includes a cache 324-2 and a processor 326-2. Execution node 322-*n* includes a cache 324-*n* and a processor 326-*n*.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
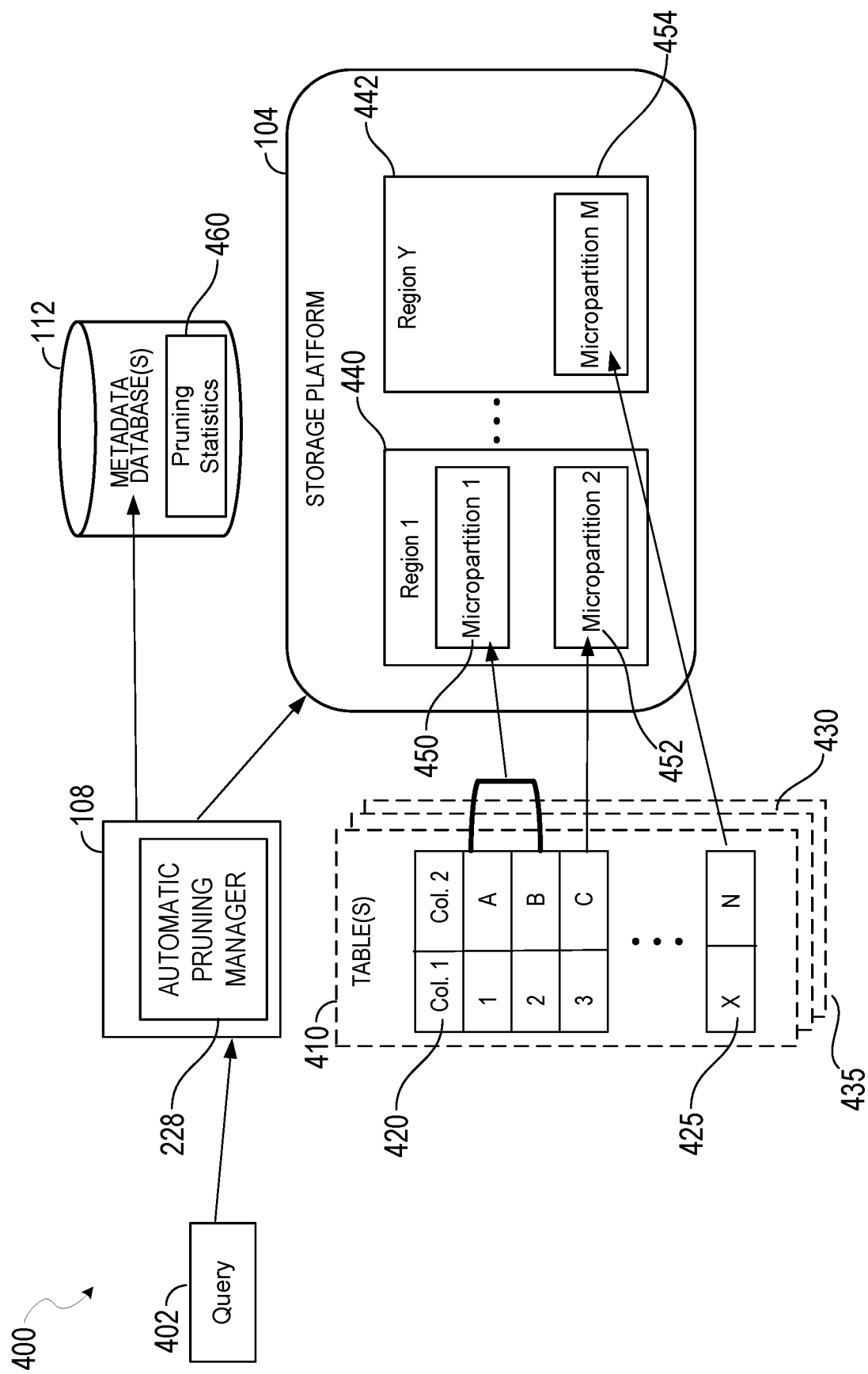
FIG. 4 is a computing environment conceptually illustrating an example software architecture for determining pruning cutoffs, in accordance with some embodiments of the present disclosure.

FIG. 4 is a computing environment 400 conceptually illustrating an example software architecture for performing automatic pruning of queries on a database system (e.g., the network-based data warehouse system 102), which can be performed by the automatic pruning manager 228 of the compute service manager 108, in accordance with some embodiments of the present disclosure.

As illustrated, the automatic pruning manager 228 performs an analysis of a query 402 which can involve at least one table (e.g., table 410, table 430, and table 435). In the example of FIG. 4, table 410 may be a large table (e.g., with many rows and columns of data). As illustrated, table 410 includes one or more rows 420 to 425. In the example of FIG. 4, table 410 is organized into a set of regions including region 440 to region 442. Moreover, each row in table 410 can be stored as a respective micro-partition in storage platform 104. For example, the first two rows in table 410 are stored in region 440 in a first micro-partition 450, a third row in table 410 is stored in region 440 in a second micro-partition 452, and a row 425 is stored in region 442 in a micro-partition 454.

It is appreciated, however, the above discussion describes examples of how a given table may be organized with respect to the pruning process as described herein, but other ways to organize the table can be implemented and still be within the scope of how the automatic pruning manager 228 can determine pruning cutoffs.

In an embodiment, a logical architecture of the automatic pruning manager 228 can include the following as discussed below.

In an embodiment, the core of automated pruning cutoff is to make decisions on whether to cutoff or reorder pruning predicates during the pruning process. The architecture of the automatic pruning manager 228 can include 1) a statistics collection component, 2) a decision making component, and 3) a cutoff applying and predicate reordering component. Each of the aforementioned components are discussed below.

As part of a pruning process, the automatic pruning manager 228 can perform a statistics collection e.g., collecting the required statistics for pruning like pass rate, time value, time to load a region of a given table into a cache, etc., where statistics can be calculated based at least in part on base statistics. In an embodiment, the automatic pruning manager 228 stores such statistics as pruning statistics 460 in metadata database 112. Alternatively, pruning statistics 460 can be stored in memory for the duration of the query compilation.

The automatic pruning manager 228, at various checkpoints (e.g., a particular point in time that can be associated with a particular stage of the pruning process) during the pruning process, performs a decision making process. In an embodiment, this decision making process can utilize multiple strategies (e.g., respective decisions or a set of decisions) for predicate cutoff, global cutoff and also predicate re-ordering.

After a decision is made by the automatic pruning manager 228 at a particular checkpoint, the automatic pruning manager 228 applies the set of decisions. In an embodiment, if the automatic pruning manager 228 makes a decision for any cutoff or reordering, then a current pruner tree is modified to remove the applicable pruner (e.g., corresponding to a particular pruning operation). For example, if a predicate pruner is to be cut off, the automatic pruning manager 228 removes it from the pruner tree and performs re-ordering of the pruner tree structure due to this removal. Alternatively or conjunctive, re-ordering of the pruner tree structure can be an orthogonal decision to a cut off since even if there is not a decision to perform a cutoff, the automatic pruning manager 228 can determine that reordering predicates is to be performed.

Different strategies can be employed by the automatic pruning manager 228, and each strategy can be utilized independently or conjunctively with each other strategy depending at least in part on the type of scenario encountered by the automatic pruning manager 228. The following relates to cutoff strategies for predicates which can be implemented by the automatic pruning manager 228:

Predicate Cutoff Strategies:
  Time value based: time value is a good estimator for pruner's performance. For pruners with extremely low time value, the automatic pruning manager 228 can cut them off.
  EP loading time based: cutoff all predicates related to one specific column when potential time saved from pruning is less than the total time spent on pruning those predicates.

Definition of EP Loading Time Based Cutoff:
  PR_{predicate}: pass rate of this predicate pruner
  input_file_count_{predicate}: total number of input files passed into this pruner
  avg_file_size: estimated average size of the input files
  warehouse_size: the warehouse size used in running this query
  F(region set): total number of files in this region set
  R_{not_cached}_{s}: remaining non-cached regions after region level pruning
  R_{s}=R_{not_cached}_{s}+R_{cached}_{s}: all remaining regions
  T_{ep}_{column}: average time loading ep of this column T_{pruning}_{predicate}: average time spent on pruning a file using specific predicate pruner Time Saved for Pruning all Predicates Related to One Specific Column:
  \sum (1−PR_{predicate})*(input_file_count_{predicate})*(avg_file_size)/{warehouse size}

Time Spent in Pruning on all Predicates Related to One Specific Column:
  T_{s}=F(R_{not_cached}_{s})*T_{ep}_{column}+ \sum (T_{pruning}_{predicate}*input_file_count_{predicate})

The following discussion relates to global cutoff strategies, which can be implemented by the automatic pruning manager 228. As mentioned before, metadata pertaining to a column of a micro-partition may be referred to as an expression property (EP) and can be stored in a respective file (e.g., "EP file").

Time based: this cutoff decision is based on whether it's worth keeping pruning given an estimation of how long pruning will take versus how long it would take to scan the set of files that will be pruned out with the remaining pruning process. The micro-partitions that will remain after pruning are not part of the consideration since they need to be scanned anyway. The pruning time estimate can be computed based on the observation of how long the pruning has taken so far, which should be relatively accurate. The pruning time estimation consists of two main parts:
  EP (expression properties) loading time and pruning time: The automatic pruning manager 228 keeps track of how long each part takes for the regions pruned so far, and predict the total EP loading time and pruning time remaining based on that. The EP loading time for the remaining region depends on the current state of a cache for the EP. The execution time estimate can be determined based on the number and size of the remaining files, the filter rate observed so far, as well as the warehouse size, etc. In an example, the automatic pruning manager 228 set a conservative threshold until there is sufficient confidence in the estimation.

In an example, the subject system can make the global cutoff decision when this formula holds:
  Potential execution time saved from pruning<=potential ep loading time+potential pruning time
  Potential ep loading time+potential pruning time:

$$T_{s}=F(R_{not\_cached}\_{s})*T_{ep}+F(R_{s})*T_{pruning}$$

Each item is defined as follows:
  R_{s}=R_{not_cached}_{s}+R_{cached}_{s}: all remaining regions
  T_{ep}: average time to load a EP file
  T_{pruning}: average time taken to prune a file
  F(region set): total number of files in this region set Potential execution time saved from pruning:

$$T_{e}=F(R_{s})*(1-\text{pass rate})*(\text{avg file size})/(\text{warehouse size})$$

Simplified version: consider all EP files are not cached, where R_{s}=R_{not_cached}_{s} holds
  File number based: if the total number of remaining files is negligible, then the automatic pruning manager 228 may determine that continuing pruning is not needed.

The following discussion relates to various reordering strategies, which can be implemented by the automatic pruning manager 228:

Time value based: reordered by time value, it can be proven that sorting based on time value can yield the global minimal time. However, a time value can be skewed due to the law of large numbers. For example, a pruner only pruned 10 files out of 20 input files has a high time value, automatic pruning manager 228 prefers to put a pruner that can pruned 5000 files out of 20000 files earlier even if it's time value is not as high as the previous one. In this example, the automatic pruning manager 228 uses the 'total number of files that can be pruned out by this predicate pruner' as a metric the separate pruners in two groups and sort them in their group respectively.

The following discussion relates to statistics collection, which can be implemented the automatic pruning manager 228:

Random shuffle: one factor that would influence the accuracy of statistics is the distribution of the regions. Consider a case when in a table, there are two kinds of regions. a) most files in this region can be pruned out by current pruners. b) most files in the region can not be pruned out by current pruners. When many regions of kind b appear in the early part of the region list, then the automatic pruning manager 228 probably made a decision to cutoff pruners since their performance seems not good. However, it's not a good decision since the opportunity might be lost to prune out files in regions of kind a. The distribution of regions can be optimized by doing a random shuffle of the region list before the pruning.

History pruner tree structure: the pruner tree structure is changing during the pruning process, the automatic pruning manager 228 keeps this information in pruner statistics which can be helpful for subsequent purposes In an embodiment, the automatic pruning manager 228 provides adaptive checkpoint selection strategies which are based on decisions made at prior checkpoints. In an example, the adaptive checkpoint applied for a case where there might not be enough statistics or accurate statistics to reflect the pruner performance after cutoff in previous checkpoints. Advantageously, adaptively changing the later checkpoints position could improve determining cutoff decisions that are better for later checkpoints.

Figure 5:
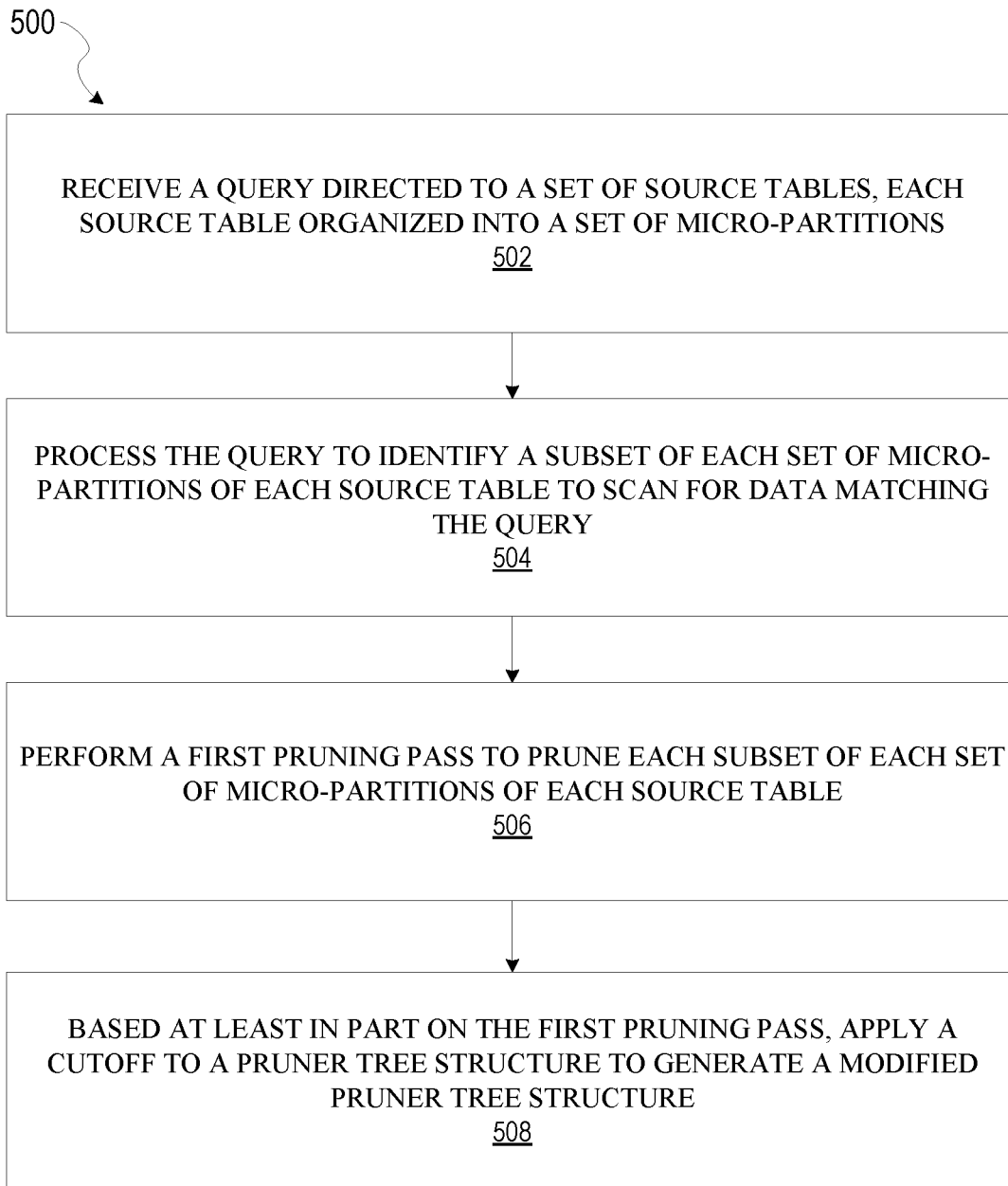
FIG. 5 is a flow diagram illustrating operations of a database system in performing a method, in accordance with some embodiments of the present disclosure.

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based data warehouse system 102, such as components of the compute service manager 108 or a node in the execution platform 110. Accordingly, the method 500 is described below, by way of example with reference thereto. However, it shall be appreciated that the method 500 may be deployed on various other hardware configurations and is not intended to be limited to deployment within the network-based data warehouse system 102.

At operation 502, the automatic pruning manager 228 receives a query directed to a set of source tables, each source table organized into a set of micro-partitions. In an example, each source table comprises a set of regions, and each region comprises a particular set of micro-partitions.

In an embodiment, the automatic pruning manager 228 generates, prior to receiving the query, pruning metadata corresponding to the set of source tables, the pruning metadata comprising statistics of previous pruning operations performed on the set of source tables.

In an embodiment, the following operations are performed for so-called "file level" pruning cutoff, rather than "region level" where pruning cutoff does not occur (e.g., not performed by the automatic pruning manager 228).

At operation 504, the automatic pruning manager 228 processes the query to identify a subset of each set of micro-partitions of each source table to scan for data matching the query.

At operation 506, the automatic pruning manager 228 performs a first pruning pass to prune each subset of each set of micro-partitions of each source table, where performing the first pruning pass comprises using pruning metadata to identify a set of pruning operations to forgo performing as part of a pruning process for the query. A first pass, in this example, refers to pruning from a first region until a first checkpoint where an $i^{th}$ pass can equal a pruning procedure between $i^{th}$ checkpoint and $(i-1)^{th}$ checkpoint. In this example, a checkpoint 0 can be considered before the first file in the first region.

In an embodiment, the automatic pruning manager 228 uses a pruner tree structure to identify the set of pruning operations to forgo performing as part of a pruning process for the query. In an example, the pruner tree structure comprises a set of nodes, each node corresponding to a respective pruner, and each respective pruner associated with a particular pruning operation. In an example, the particular pruning operation is related to a predicate. In an embodiment, the automatic pruning manager 228 determines a decision with respect to at least one cutoff to apply to the pruner tree structure. At operation 508, the automatic pruning manager 228, based at least in part on the first pruning pass, applies a cutoff to a pruner tree structure to generate a modified pruner tree structure. In an embodiment, the automatic pruning manager 228 performs the pruning process using the modified pruner tree structure.

Figure 6:
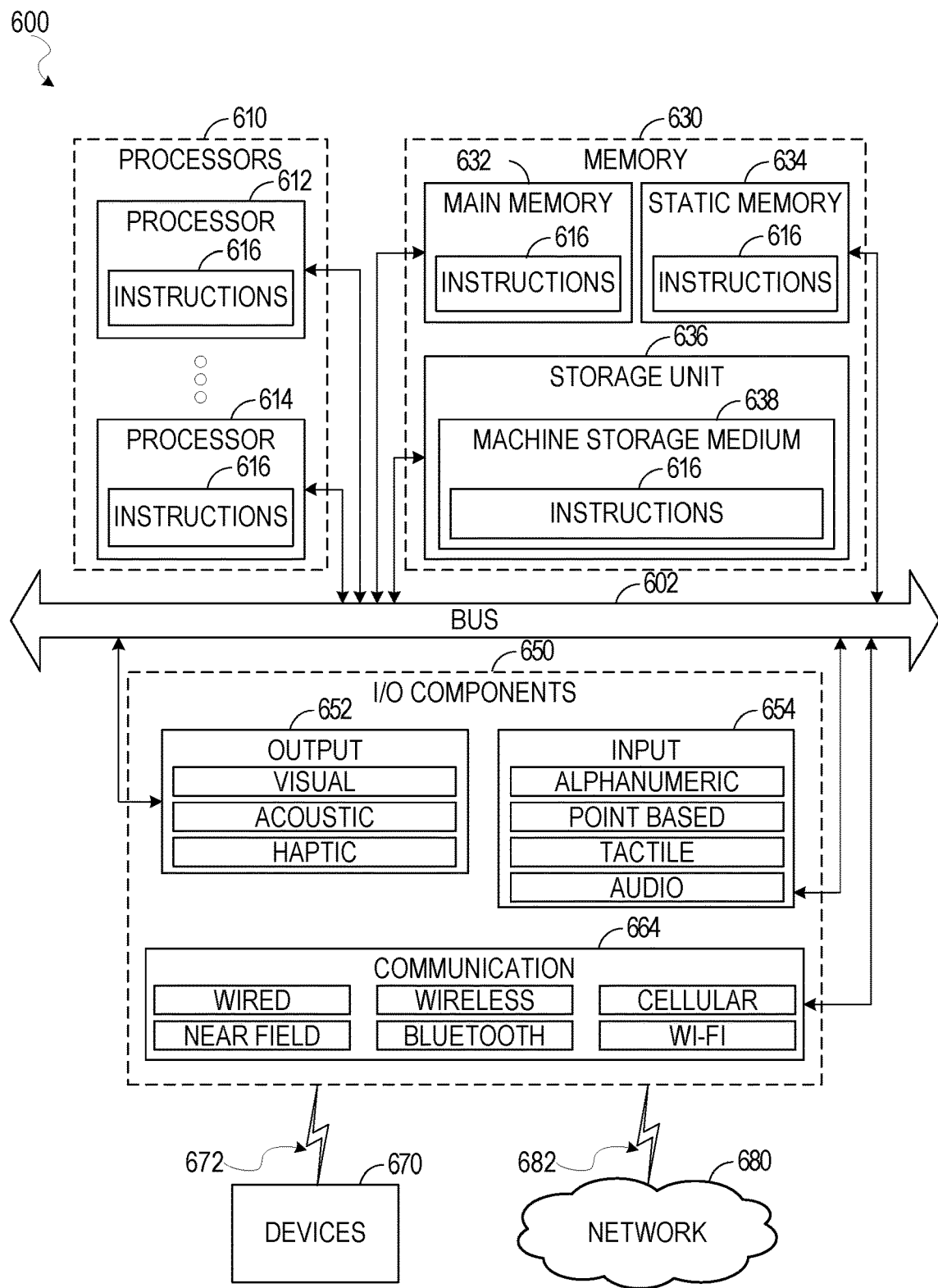
FIG. 6 illustrates a diagrammatic representation of a machine in the form of a computer system within which a set of instructions may be executed for causing the machine to perform any one or more of the methodologies discussed herein, in accordance with some embodiments of the present disclosure.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute any one or more operations of the method 500. As another example, the instructions 616 may cause the machine 600 to implement portions of the data flows illustrated in at least FIG. 4. In this way, the instructions 616 transform a general, non-programmed machine into a particular machine 600 (e.g., the compute service manager 108 or a node in the execution platform 110) that is specially configured to carry out any one of the described and illustrated functions in the manner described herein.

In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 includes processors 610, memory 630, and input/output (I/O) components 650 configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within machine storage medium 638 of the storage unit 636, within at least one of the processors 610 (e.g., within the processor's cache memory), or any suitable combination thereof, during execution thereof by the machine 600.

The I/O components 650 include components to receive input, provide output, produce output, transmit information, exchange information, capture measurements, and so on. The specific I/O components 650 that are included in a particular machine 600 will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components to provide communication via other modalities. The devices 670 may be another machine or any of a wide variety of peripheral devices (e.g., a peripheral device coupled via a universal serial bus (USB)). For example, as noted above, the machine 600 may correspond to any one of the compute service manager 108 or the execution platform 110, and the devices 670 may include the client device 114 or any other computing device described herein as being in communication with the network-based data warehouse system 102 or the cloud storage platform 104.

Executable Instructions and Machine Storage Medium

The various memories (e.g., 630, 632, 634, and/or memory of the processor(s) 610 and/or the storage unit 636) may store one or more sets of instructions 616 and data structures (e.g., software) embodying or utilized by any one or more of the methodologies or functions described herein. These instructions 616, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Conclusion

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   a memory storing instructions that cause the at least one hardware processor to perform operations comprising:
      receiving, during a query compilation process, a query directed to a set of source tables, each source table from the set of source tables being organized into at least one micro-partition and the query including at least one pruning operation;
      performing, during the query compilation process, a modification of the query for adjusting the at least one pruning operation, the modification being based at least in part on a set of statistics collected for previous pruning operations on at least a portion of the set of source tables and a set of heuristics, the set of statistics indicating at least an amount of execution time for each previous query associated with each of the previous pruning operations, the set of heuristics comprising at least one property based predicate ordering heuristic;

determining, during a pruning process of a second query, the second query directed to a set of files in a database system and including a set of pruning operations on the set of files, whether to perform a pruning cutoff on the set of pruning operations based at least in part on a second set of statistics, the pruning process performing a depth first search of a pruner tree structure, the pruner tree structure receiving the set of files as input, the pruning tree structure comprising a set of nodes, each node corresponding to a particular pruning operation; and performing the pruning cutoff based on the determining, the pruning cutoff ceasing at least one pruning operation from the set of pruning operations.

2. The system of claim 1, wherein the at least one property based predicate ordering heuristic comprises a pass rate, the pass rate indicating an amount of data from the set of source tables that was pruned based on a previous pruning operation, wherein at least one particular pruning operation of a particular node corresponds to a particular predicate to prune in the set of files, wherein the set of files comprises a set of micro-partitions, at least some of the set of micro-partitions being pruned in a pruner corresponding to one node from the pruning tree structure such that there is a non-increasing number of input micro-partitions corresponding to an output micro-partition count of a previous pruner in the pruner tree structure, and wherein performing the pruning cutoff comprises a two-level cutoff, the two-level cutoff comprises region level pruning and file level pruning, the region level pruning comprises passing a first bitset to the pruner tree structure to perform the pruning, the first bitset indicating each region that remains after pruning, and the file level pruning comprises passing a second bitset to the pruner tree structure to perform the pruning, the second bitset indicating each file that remains after pruning.

3. The system of claim 2, wherein the operations further comprise:

compiling the query including the modification of the query; and providing the compiled query to an execution node of a database system for execution.

4. The system of claim 1, wherein the second set of statistics is different than the set of statistics related to the query.

5. The system of claim 1, wherein determining whether to perform the pruning cutoff is based on at least a time value, predicate selectivity, predicate tree structure, a time for loading the set of files into memory, or an estimated query execution time.

6. The system of claim 1, wherein determining whether to perform the pruning cutoff is based on at least a set of checkpoints during the pruning process, or a set of statistics that are collected between each checkpoint.

7. The system of claim 6, wherein each checkpoint comprises a period of time in which the pruning process is performed on the set of files, the period of time corresponding to a particular number of pruning operations that have been performed during the period of time.

8. The system of claim 1, wherein determining whether to perform the pruning cutoff is based on at least a global pruning cutoff decision to forgo a pruning operation on a particular table, the global pruning cutoff decision based on an estimation of an amount of time for performing the pruning operation and a second amount of time to scan a set of files that are pruned.

9. The system of claim 3, wherein determining whether to perform the pruning cutoff is based on at least a comparison of a pass rate and a pruning time for a set of regions, and the operations further comprise:

determining to perform a predicate re-ordering to place a set of predicates before a second set of predicates.

10. The system of claim 3, wherein determining whether to perform the pruning cutoff is based on at least a comparison of a pass rate and a pruning time for a set of regions, and the operations further comprise:

determining to perform a predicate cutoff to remove a set of predicates.

11. A method comprising:

receiving, during a query compilation process, a query directed to a set of source tables, each source table from the set of source tables being organized into at least one micro-partition and the query including at least one pruning operation;

performing, during the query compilation process, a modification of the query for adjusting the at least one pruning operation, the modification being based at least in part on a set of statistics collected for previous pruning operations on at least a portion of the set of source tables and a set of heuristics, the set of statistics indicating at least an amount of execution time for each previous query associated with each of the previous pruning operations, the set of heuristics comprising at least one property based predicate ordering heuristic;

determining, during a pruning process of a second query, the second query directed to a set of files in a database system and including a set of pruning operations on the set of files, whether to perform a pruning cutoff on the set of pruning operations based at least in part on a second set of statistics, the pruning process performing a depth first search of a pruner tree structure, the pruner tree structure receiving the set of files as input, the pruning tree structure comprising a set of nodes, each node corresponding to a particular pruning operation; and performing the pruning cutoff based on the determining, the pruning cutoff ceasing at least one pruning operation from the set of pruning operations.

12. The method of claim 11, wherein the at least one property based predicate ordering heuristic comprises a pass rate, the pass rate indicating an amount of data from the set of source tables that was pruned based on a previous pruning operation.

13. The method of claim 12, wherein further comprising:

compiling the query including the modification of the query; and providing the compiled query to an execution node of a database system for execution.

14. The method of claim 11, wherein the second set of statistics is different than the set of statistics related to the query.

15. The method of claim 11, wherein determining whether to perform the pruning cutoff is based on at least a time value, predicate selectivity, predicate tree structure, a time for loading the set of files into memory, or an estimated query execution time.

16. The method of claim 11, wherein determining whether to perform the pruning cutoff is based on at least a set of checkpoints during the pruning process, or a set of statistics that are collected between each checkpoint.

17. The method of claim 16, wherein each checkpoint comprises a period of time in which the pruning process is performed on the set of files, the period of time corresponding to a particular number of pruning operations that have been performed during the period of time.

18. The method of claim 11, wherein determining whether to perform the pruning cutoff is based on at least a global pruning cutoff decision to forgo a pruning operation on a particular table, the global pruning cutoff decision based on an estimation of an amount of time for performing the pruning operation and a second amount of time to scan a set of files that are pruned.

19. The method of claim 13, wherein determining whether to perform the pruning cutoff is based on at least a comparison of a pass rate and a pruning time for a set of regions, and further comprising:
  determining to perform a predicate re-ordering to place a set of predicates before a second set of predicates.

20. The method of claim 13, wherein determining whether to perform the pruning cutoff is based on at least a comparison of a pass rate and a pruning time for a set of regions, and further comprising:
  determining to perform a predicate cutoff to remove a set of predicates.

21. A non-transitory computer-storage medium comprising instructions that, when executed by one or more processors of a machine, configure the machine to perform operations comprising:
  receiving, during a query compilation process, a query directed to a set of source tables, each source table from the set of source tables being organized into at least one micro-partition and the query including at least one pruning operation;
  performing, during the query compilation process, a modification of the query for adjusting the at least one pruning operation, the modification being based at least in part on a set of statistics collected for previous pruning operations on at least a portion of the set of source tables and a set of heuristics, the set of statistics indicating at least an amount of execution time for each previous query associated with each of the previous pruning operations, the set of heuristics comprising at least one property based predicate ordering heuristic;
  determining, during a pruning process of a second query, the second query directed to a set of files in a database system and including a set of pruning operations on the set of files, whether to perform a pruning cutoff on the set of pruning operations based at least in part on a second set of statistics, the pruning process performing a depth first search of a pruner tree structure, the pruner tree structure receiving the set of files as input, the pruning tree structure comprising a set of nodes, each node corresponding to a particular pruning operation; and
  performing the pruning cutoff based on the determining, the pruning cutoff ceasing at least one pruning operation from the set of pruning operations.

22. The non-transitory computer-storage medium of claim 21, wherein the at least one property based predicate ordering heuristic comprises a pass rate, the pass rate indicating an amount of data from the set of source tables that was pruned based on a previous pruning operation.

23. The non-transitory computer-storage medium of claim 22, wherein the operations further comprise:
  compiling the query including the modification of the query; and
  providing the compiled query to an execution node of a database system for execution.

24. The non-transitory computer-storage medium of claim 21, wherein the second set of statistics is different than the set of statistics related to the query.

25. The non-transitory computer-storage medium of claim 21, wherein determining whether to perform the pruning cutoff is based on at least a time value, predicate selectivity, predicate tree structure, a time for loading the set of files into memory, or an estimated query execution time.

26. The non-transitory computer-storage medium of claim 21, wherein determining whether to perform the pruning cutoff is based on at least a set of checkpoints during the pruning process, or a set of statistics that are collected between each checkpoint.

27. The non-transitory computer-storage medium of claim 26, wherein each checkpoint comprises a period of time in which the pruning process is performed on the set of files, the period of time corresponding to a particular number of pruning operations that have been performed during the period of time.

28. The non-transitory computer-storage medium of claim 21, wherein determining whether to perform the pruning cutoff is based on at least a global pruning cutoff decision to forgo a pruning operation on a particular table, the global pruning cutoff decision based on an estimation of an amount of time for performing the pruning operation and a second amount of time to scan a set of files that are pruned.

29. The non-transitory computer-storage medium of claim 21, wherein determining whether to perform the pruning cutoff is based on at least a comparison of a pass rate and a pruning time for a set of regions, and the operations further comprise:
  determining to perform a predicate re-ordering to place a set of predicates before a second set of predicates.

30. The non-transitory computer-storage medium of claim 21, wherein determining whether to perform the pruning cutoff is based on at least a comparison of a pass rate and a pruning time for a set of regions, and the operations further comprise:
  determining to perform a predicate cutoff to remove a set of predicates.

* * * * *